(12) United States Patent
Goszczynski

(10) Patent No.: US 9,196,387 B2
(45) Date of Patent: Nov. 24, 2015

(54) APPARATUS AND METHOD FOR DETECTING POSITION OF ANNULUS SPACER BETWEEN CONCENTRIC TUBES

(71) Applicant: Atomic Energy of Canada Limited, Mississauga (CA)

(72) Inventor: Jaroslaw Jan Goszczynski, Oakville (CA)

(73) Assignee: Atomic Energy of Canada Limited, Ontario (CA)

(*) Notice: Subject to any disclaimer, the term of this patent is extended or adjusted under 35 U.S.C. 154(b) by 613 days.

(21) Appl. No.: 13/665,970

(22) Filed: Nov. 1, 2012

(65) Prior Publication Data

US 2013/0114777 A1    May 9, 2013

Related U.S. Application Data

(60) Provisional application No. 61/555,375, filed on Nov. 3, 2011.

(51) Int. Cl.
| | |
|---|---|
| G01N 25/00 | (2006.01) |
| G01J 5/00 | (2006.01) |
| G01K 1/00 | (2006.01) |
| G01K 3/00 | (2006.01) |
| G01K 13/00 | (2006.01) |
| G21C 17/112 | (2006.01) |
| G21C 17/017 | (2006.01) |
| G21C 17/06 | (2006.01) |

(52) U.S. Cl.
CPC ............ *G21C 17/112* (2013.01); *G21C 17/017* (2013.01); *G21C 17/06* (2013.01)

(58) Field of Classification Search
USPC ........ 374/148, 137, 208, 4, 6, 7, 45, 124, 120
See application file for complete search history.

(56) References Cited

U.S. PATENT DOCUMENTS

| | | | |
|---|---|---|---|
| 3,691,840 A * | 9/1972 | Dufour et al. ................. | 136/230 |
| 6,595,684 B1 | 7/2003 | Casagrande et al. | |
| 7,249,885 B2 | 7/2007 | Van Den Ende et al. | |
| 2007/0237283 A1* | 10/2007 | Payne et al. .................... | 376/261 |
| 2009/0092173 A1* | 4/2009 | Glombitza .................... | 374/161 |
| 2010/0290502 A1* | 11/2010 | Cubizolles .................... | 374/141 |
| 2011/0311015 A1* | 12/2011 | Ziaei et al. .................... | 376/362 |
| 2012/0039358 A1* | 2/2012 | Bosselmann et al. ......... | 374/161 |
| 2014/0146854 A1* | 5/2014 | Ashjaee et al. ................ | 374/179 |
| 2015/0096942 A1* | 4/2015 | Wang et al. ................... | 210/742 |
| 2015/0098488 A1* | 4/2015 | Wang et al. ................... | 374/152 |

* cited by examiner

*Primary Examiner* — Mirellys Jagan
(74) *Attorney, Agent, or Firm* — Michael Best & Friedrich LLP

(57) ABSTRACT

An apparatus for detecting the location of at least one annulus spacer between concentric interior and exterior tubes when a temperature gradient is present therebetween. A probe head assembly is movable within the interior tube. At least one temperature sensor is coupled to the probe head assembly and configured to detect a temperature of an interior surface of the interior tube. A drive assembly is operable to move the probe head assembly relative to the interior tube. A data acquisition system is coupled to the at least one temperature sensor and configured to receive a plurality of temperature measurements in order to identify at least one position along the interior surface having a temperature abnormality corresponding to a reduced temperature gradient.

28 Claims, 17 Drawing Sheets

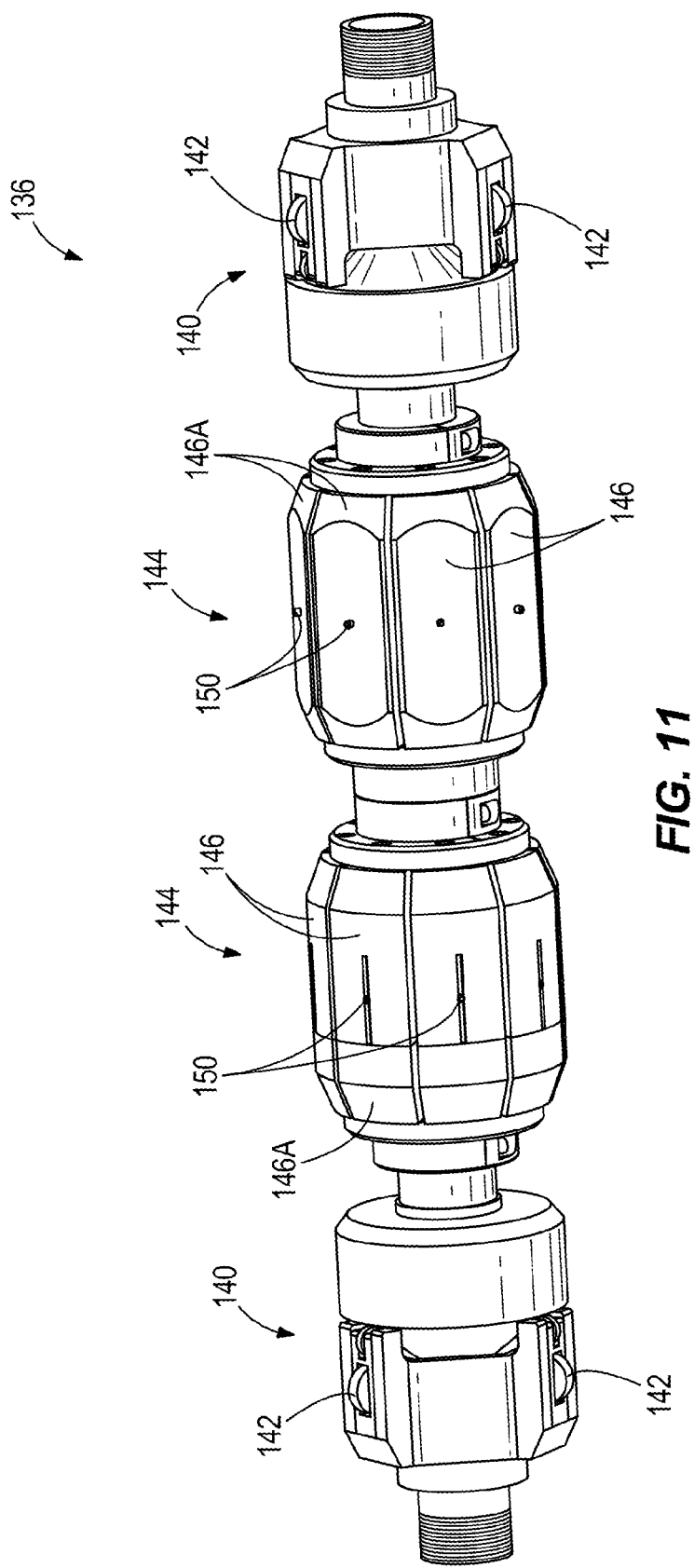

APPARATUS AND METHOD FOR DETECTING POSITION OF ANNULUS SPACER BETWEEN CONCENTRIC TUBES

CROSS-REFERENCE TO RELATED APPLICATIONS

This application claims priority to U.S. Provisional Patent Application No. 61/555,375, filed on Nov. 3, 2011, the entire contents of which are hereby incorporated by reference.

BACKGROUND

The present invention relates to fuel channels for nuclear reactors. More particularly, the invention relates to annulus spacers for use in fuel channels having concentric tubes (e.g., a calandria tube with an internal pressure tube) of a nuclear reactor, an example of which is the CANDU ("CANada Deuterium Uranium") reactor. By way of example only, the CANDU reactor is a heavy water, or light water cooled and heavy-water moderated fission reactor capable of using fuels composed of natural uranium, other low-enrichment uranium, recycled uranium, mixed oxides, fissile and fertile actinides, and combinations thereof.

Annulus spacers (AS), often provided as garter springs (GS), are used in CANDU reactors to maintain an annular gap between two tubes of a fuel channel assembly, such as an inner pressure tube (PT) and an outer calandria tube (CT) as mentioned above. The PTs are located inside the reactor CTs that insulate the PTs from the heavy water moderator in the calandria. The annular gap between the PTs and CTs is typically filled with an annulus gas. In some cases, four annulus spacers are used per fuel channel assembly, each at a specified axial position along the length of the fuel channel. It is important that the spacers are in their correct positions, as incorrect positioning may lead to contact between the hot PT and cooler CT. Such contact is unacceptable.

In some embodiments, a fuel channel assembly consists of a PT, two end fittings and associated hardware, wherein the PT is connected to the two end fittings by a mechanical roll-expanded joint. A bellows assembly rolled into the fuelling machine side tubesheet and welded to the bellows attachment ring can be used to seal the annulus at both ends. Therefore, in some fuel channel assembly embodiments, there is no direct access to the annular space between the PTs and CTs.

One known type of annulus spacer is a close-coiled helical spring. For example, such a spring can have a 4.83 mm (0.190 inch) outside diameter, can be formed into a torus using a Zircaloy-2 girdle wire, and can be formed from Zirconium alloy wire of square cross-section (e.g., 1.02×1.02 mm (0.040×0.040 inch)). The spacers can prevent direct contact between the PTs and CTs, which would be undesirable because of the increased susceptibility to blister formation as local hydrogen concentration increases due to deuterium ingress. In some embodiments, there are four spacers in each channel assembly spaced approximately 1.02 m (40 inches) apart and located in a manner offset towards the outlet end of the fuel channel assembly. The position of each of the annulus spacers is important to ensure that they meet a variety of functional, performance, safety, environmental and inter-facing system requirements.

Some annulus spacers are loose-fitting spacers provided with a garter spring and a girdle wire held within an annular cavity formed by the coiled wire of the garter spring. The girdle wire can enable a position of the annulus spacer along the fuel channel to be detected using eddy current testing (ECT) techniques (i.e., based upon the fact that the girdle wire can be made from a material that forms a loop of continuous conductivity). Other annulus spacers are tight fitting, and can have a spring tension which draws them tight onto the outside surface of the PT.

In many cases, eddy current technology cannot positively locate tight fitting spacers because the design of tight fitting spacers does not include a welded girdle wire. Other challenges with loose- and tight-fitting spacers exist, as do challenges to identifying the locations of such spacers along the axial length of fuel channel assemblies.

SUMMARY

In one aspect, the invention provides an apparatus for detecting the location of at least one annulus spacer between concentric interior and exterior tubes when a temperature gradient is present therebetween. A probe head assembly is movable within the interior tube. At least one temperature sensor is coupled to the probe head assembly and configured to detect a temperature of an interior surface of the interior tube. A drive assembly is operable to move the probe head assembly relative to the interior tube. A data acquisition system is coupled to the at least one temperature sensor and configured to receive a plurality of temperature measurements in order to identify at least one position along the interior surface having a temperature abnormality corresponding to a reduced temperature gradient.

In another aspect, the invention provides a method for detecting the location of at least one annulus spacer between concentric interior and exterior tubes having a temperature gradient therebetween. A probe head assembly including at least one temperature sensor is inserted into the interior tube. The temperature of an interior surface of the interior tube is detected at a plurality of locations along the interior surface. At least one position is identified along the interior surface having a temperature abnormality corresponding to a reduced temperature gradient.

Other aspects of the present invention will become apparent by consideration of the detailed description and accompanying drawings.

BRIEF DESCRIPTION OF THE DRAWINGS

FIG. 11 is a perspective view of a probe head assembly of a first configuration for obtaining a temperature profile of the inside of the pressure tube.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. For example, the devices and methods disclosed herein are introduced and described in the context of application in a nuclear fuel channel, and to detect garter springs or other annulus spacers. However, the devices and methods disclosed herein can be utilized in other applications and environments, and to detect other objects besides annulus spacers. By way of example only, the devices and methods can be used in downhole drilling applications to detect objects adjacent or around drilling equipment, in pipelines to detect the locations of adjacent equipment, structural supports, other objects, and in other applications as desired.

Figure 1:
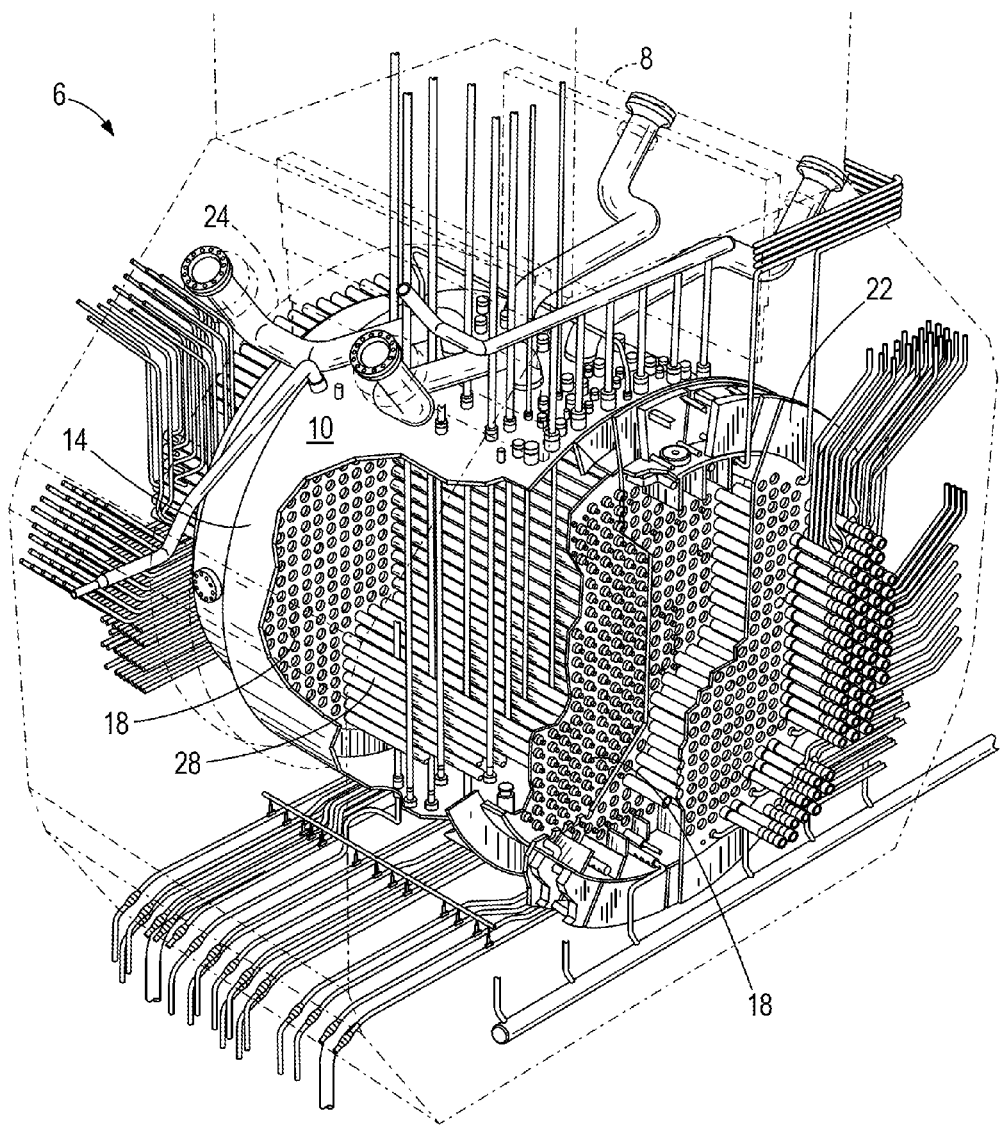
FIG. 1 is a perspective view of a reactor core of a CANDU-type nuclear reactor.

FIG. 1 is a perspective of a reactor core of a CANDU-type reactor, known as a CANDU 6, by way of example only. A generally cylindrical vessel, known as a calandria 10, contains a heavy-water moderator. The calandria 10 has an annular shell 14 and a tube sheet 18 at a first end 22 and second end 24. A number of fuel channel assemblies 28 pass through the calandria 10 from the first end 22 to the second end 24.

Figure 2:
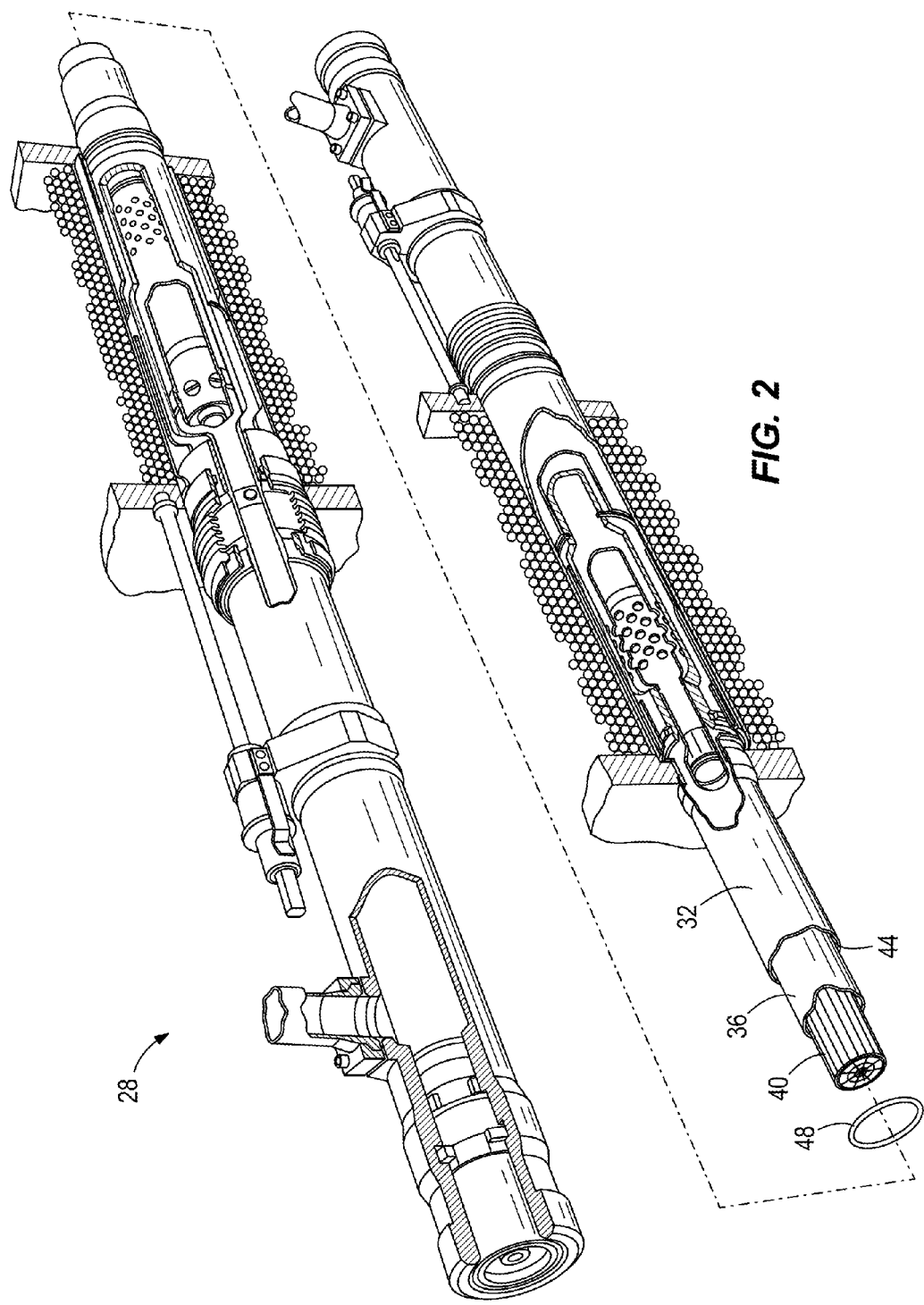
FIG. 2 is a cut-away view of a CANDU-type nuclear reactor fuel channel assembly.

As illustrated in FIG. 2, in each fuel channel assembly 28 a calandria tube 32 forms a first boundary between the heavy water moderator of the calandria 10 and structure within the CT 32. A pressure tube (PT) 36 forms an inner wall of the fuel channel assembly 28. The PT 36 provides a conduit for reactor coolant and fuel assemblies 40. The CT 32 and the PT 36 form a concentric tube assembly, and an annulus space 44 is defined by a gap between the PT 36 and the CT 32. The CT 32 constitutes an exterior tube of the pair of concentric tubes and the PT 36 constitutes an interior tube of the pair of concentric tubes. The annulus space 44 is normally filled with a circulating gas, such as dry carbon dioxide, nitrogen, air or mixtures thereof. The annulus space 44 and gas can be part of an annulus gas system. The annulus gas system has two primary functions. First, a gas boundary between the CT 32 and PT 36 provides thermal insulation between hot reactor coolant and fuel within the PTs 36 and the relatively cool CTs 32. Second, the annulus gas system provides indication of leaking calandria tubes, pressure tubes 36, or their connections via the presence of moisture in the annulus gas.

Figure 3:
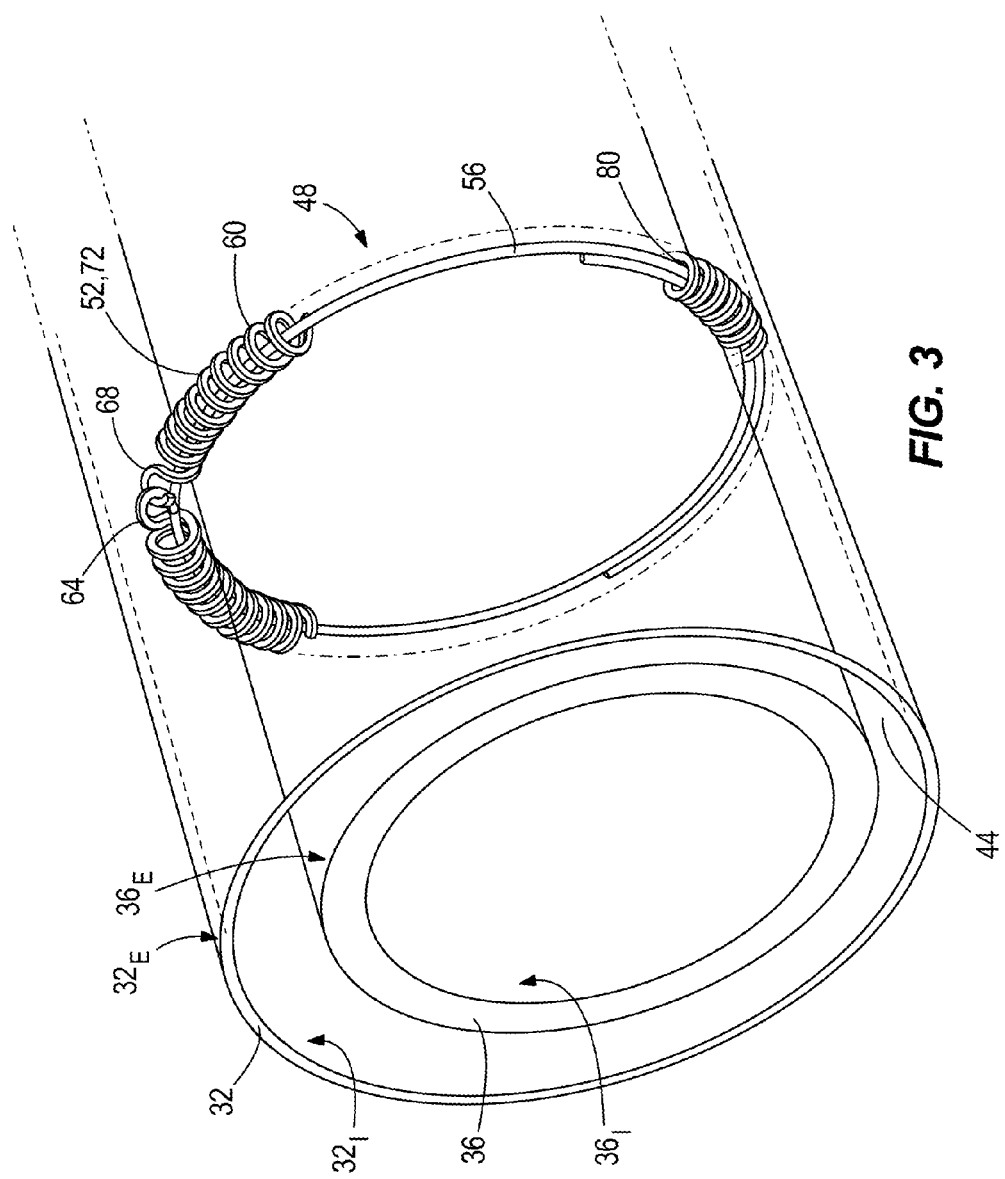
FIG. 3 is a perspective view of an annulus spacer installed in the fuel channel of a CANDU-type nuclear reactor.

A series of annulus spacers 48 is disposed between the CT 32 and PT 36 (i.e., between an exterior surface $36_E$ of the PT 36 and an interior surface $32_I$ of the CT 32). One such spacer is shown in FIG. 3. Functionally, the annulus spacers 48 maintain the prescribed gap between the PT 36 and its corresponding CT 32, while allowing the passage of annulus gas through and around the annulus spacer 48. Other functions of the annulus spacer 48 include accommodating relative axial movement between the PT 36 and CT 32 while limiting wear, scratches, deformation, or damage to the PTs 36 and CTs 32. Although annulus spacers 48 are usually designed to generally limit heat transfer from the PT 36 to the heavy-water moderator during normal operating conditions of the reactor, the annulus spacers 48 provide the only points of potential conduction directly between the PT 36 and the CT 32 between the two ends of a fuel channel assembly 28. As the annulus spacer 48 is located in the fuel channel annulus space 44, its temperature can be influenced by either the hot PT 36 (approximately 300° C. during normal reactor operation in some embodiments) or the cooler CT 32 (approximately 80° C. during normal reactor operation in some embodiments), depending on which component the annulus spacer 48 is contacting. If the annulus spacer 48 is in contact with both tubes, it will likely experience a temperature gradient between the temperatures of the PT 36 and the CT 32.

With continued reference to FIG. 3, the annulus spacer 48 is received within the annulus space 44 between the PT 36 and CT 32 as discussed above. Although the annulus spacer 48 is shown in FIG. 3 as a loose fitting spacer including a garter spring 52 and a girdle wire 56, the annulus spacer 48 may be a tight fitting spacer having no girdle wire, or can take a number of other forms suitable for maintaining the desired space between the PT 36 and CT 32. In some embodiments, the garter spring 52 is formed from a length of coiled wire 60. Two ends 64, 68 of the coiled wire 60 can be connected so that the garter spring 52 forms a toroid 72. If provided, the girdle wire 56 can be held within an annular cavity 80 formed by the coiled wire 60 of the garter spring 52. The garter spring 52 can be dimensioned to fit tightly around the PT 36, and in some embodiments is resilient so that it may be expanded to a dimension greater than an outside diameter of the PT 36 during installation, yet fit tightly and securely once positioned. The garter spring 52 may be formed from a nickel-chromium based alloy such as INCONEL X-750. In other embodiments, the garter spring 52 may be formed of other alloys, including a zirconium-based alloy such as ZIRCALOY or a zirconium-niobium-copper alloy. In still other embodiments, the garter spring 52 may be formed of an alloy including, but not limited to, a combination of zirconium, niobium, and copper.

Detecting the position of each annulus spacer 48 is necessary in many applications in order to verify the location of the annulus spacer 48, and to thereby ensure that the annulus spacer 48 meets a variety of functional, performance, safety, environmental, and inter-facing system requirements. Embodiments of the present invention provide an apparatus and a method of locating annulus spacers 48 via thermal analysis or profiling of one or both of the CT 32 and the PT 36 by detecting a response of each annulus spacer 48 to a temperature gradient present between the CT 32 and the PT 36. In some embodiments, the location of a tight fitting garter spring installed on the PT 36 may be discerned within a tolerance of about 15 mm or better without the use of eddy current testing.

Figure 4:
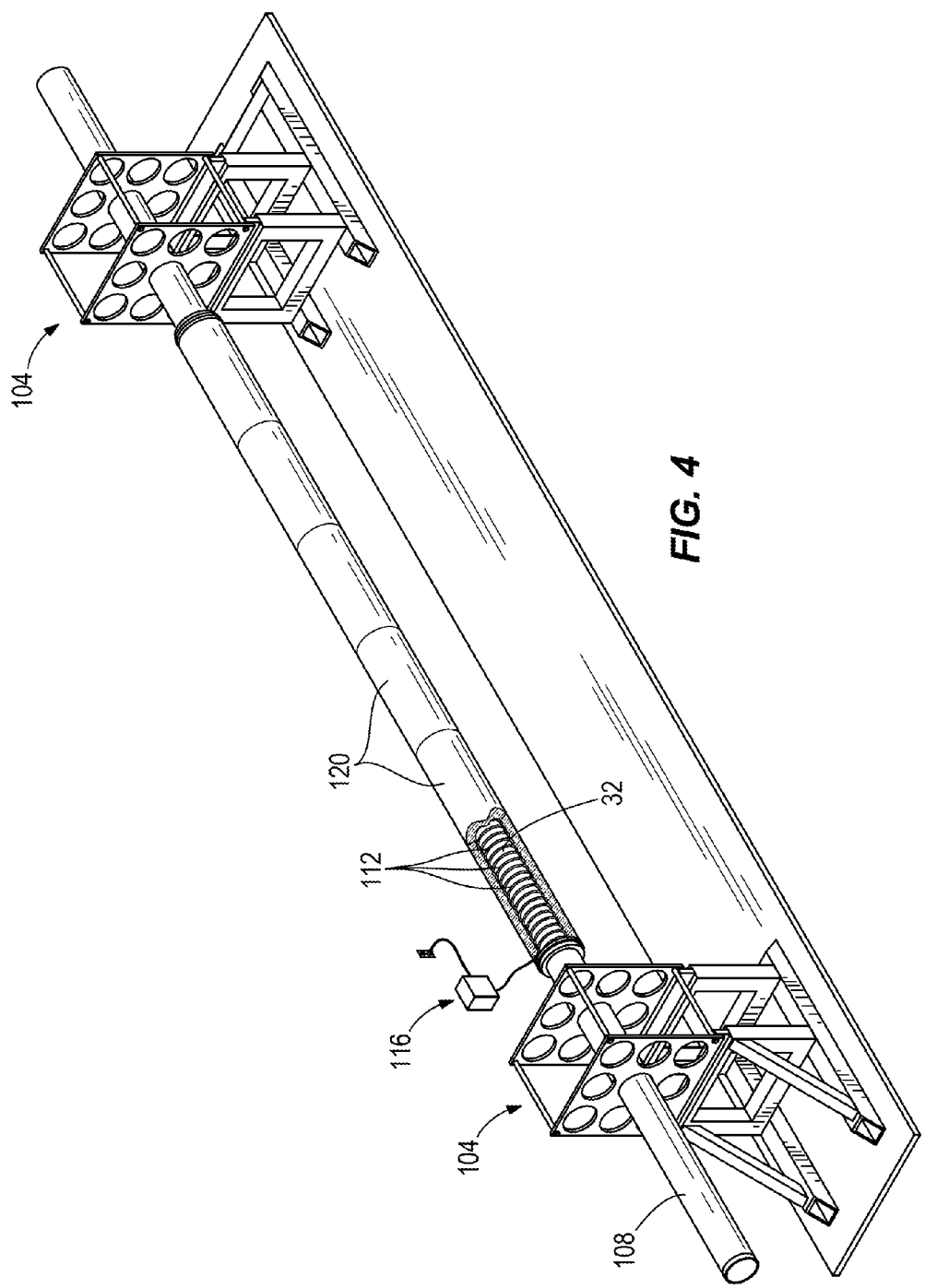
FIG. 4 is a perspective view of an apparatus for locating annulus spacers between the pressure tube and the calandria tube of a fuel channel assembly utilizing thermal profiling.
Figure 5:
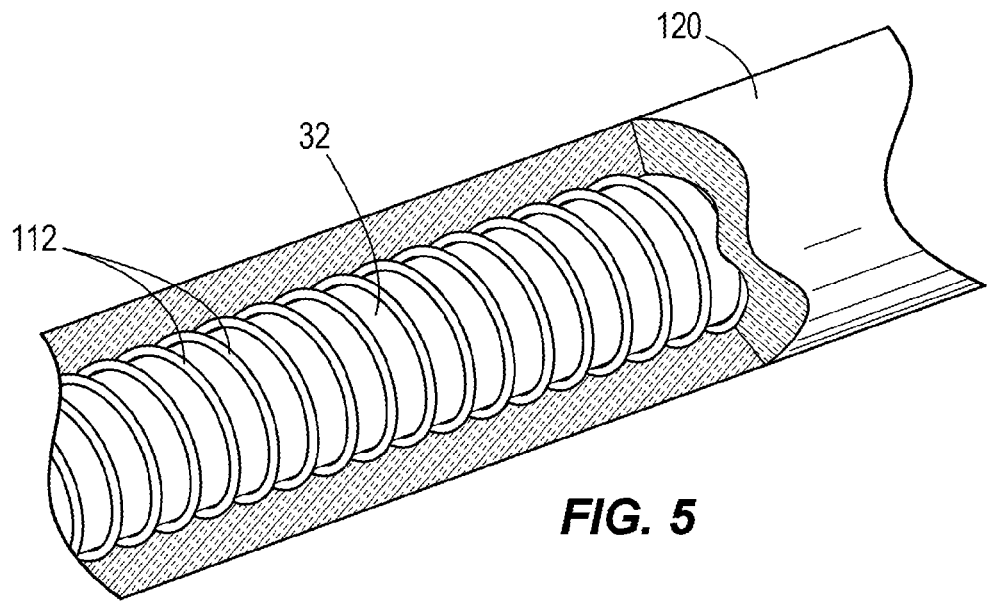
FIG. 5 is a perspective view of a heating cable wrapped about the outside of a calandria tube.
Figure 6:
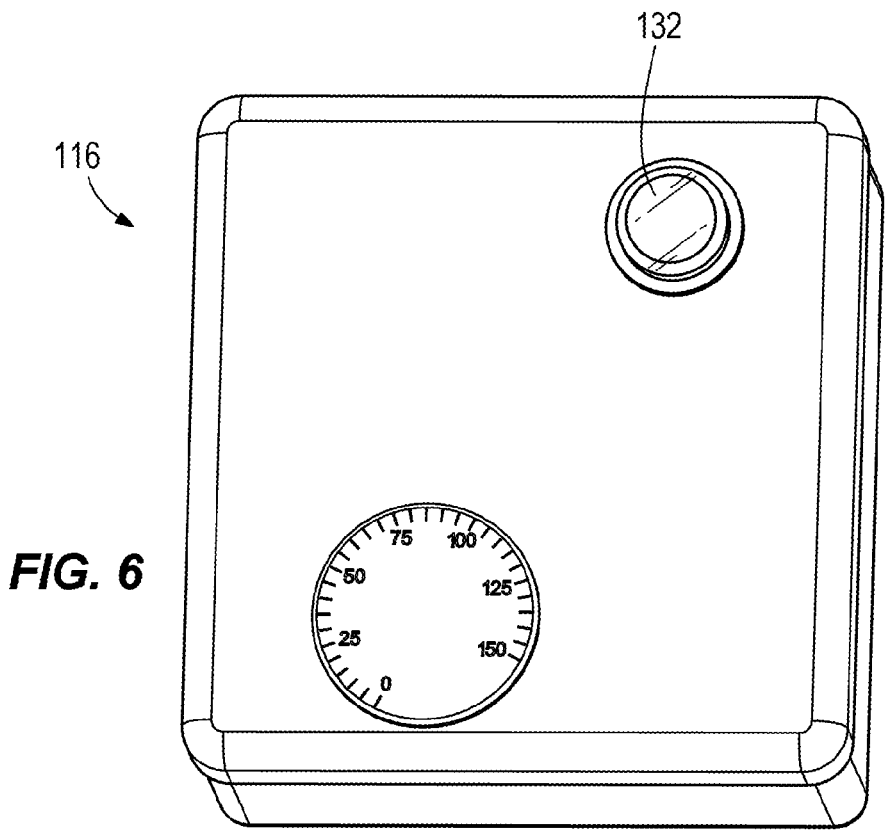
FIG. 6 is a front view of a heater control box operatively coupled to the heating cable of FIG. 5.

FIGS. 4-25 illustrate a lab-based detection apparatus 100 and method, according to certain embodiments of the present invention, for identifying the position of annulus spacers 48 between a CT 32 and a PT 36 outside of a calandria 10. The CT 32 is suspended between the centre lattice sites of two 3×3 lattice site stands 104 (FIG. 4). A first end of the apparatus 100 includes an end fitting 108 complete with a clearance fit pressure tube hub. This end fitting does not feature a liner tube. A liner tube protective sleeve can be used in the first end fitting to retain the pressure tube and to provide a uniform tool delivery surface. Four garter springs 52 or other annulus spacers 48 are provided between the PT 36 and the CT 32. The garter springs 52 can be tight-fitting on the PT 36 in some embodiments. It should also be noted that more or less than four annulus spacers 48 can be provided, including zero, and the number need not be known prior to carrying out the detection method, which can effectively determine both the number and position of annulus spacers 48.

Figure 7:
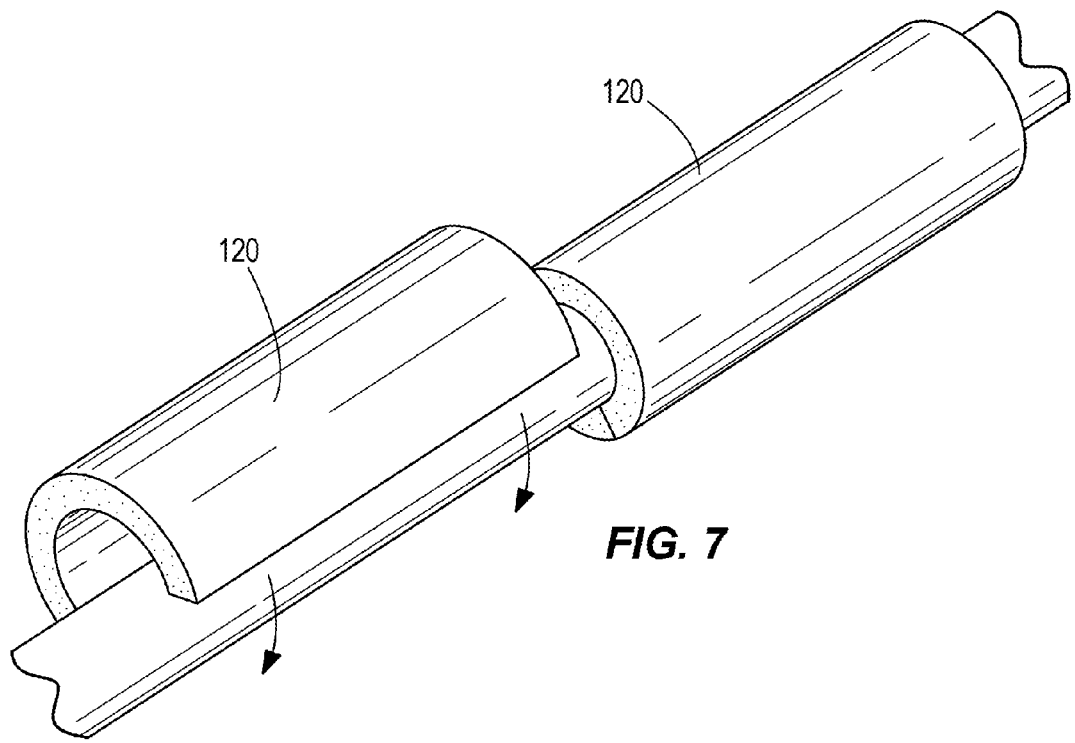
FIG. 7 is a perspective view of a section of fiberglass pipe insulation being installed on the heater-wrapped calandria tube.

Again referencing the apparatus 100 of FIG. 4, the exterior surface $32_E$ of the CT 32 is tightly wrapped with a heater 112, such as a BriskHeat FE heating cable (FIG. 5), and can be wrapped in a helical manner along the CT 32. The pitch spacing of the heating cable wrap can be approximately 2.5", for example. A heater control box 116 (FIG. 6) can be mounted at the first end of the CT 32, or in any other suitable location. The installed heating cable 112 can be covered with insulation 120, such as 6-inch diameter (Iron Pipe Size), 2-inch thick fiberglass pipe insulation with ASJ (All Service Jacket) as shown in FIG. 7. The insulation 120 may be provided in 3-foot long sections.

Figure 8:
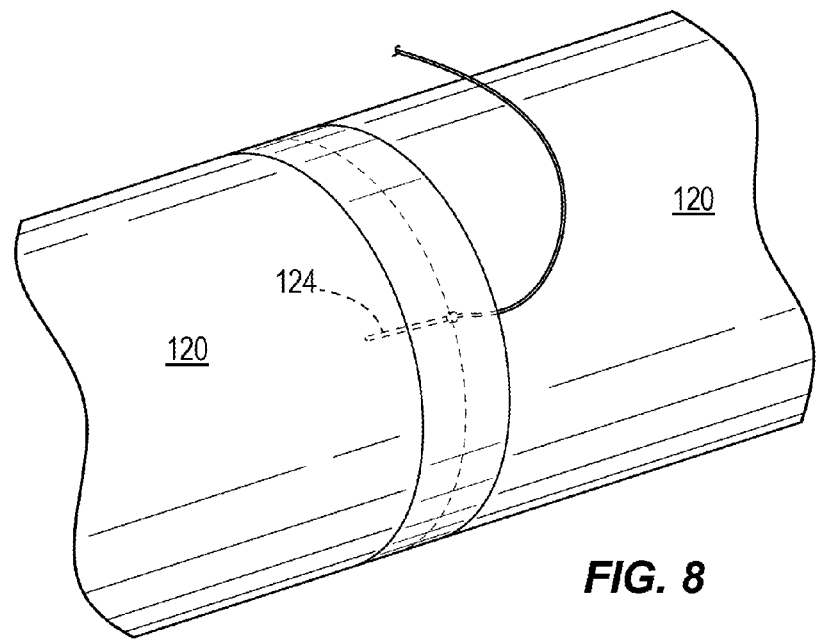
FIG. 8 is a perspective view of a thermostat bulb extending through the insulation to the exterior surface of the calandria tube.
Figure 9:
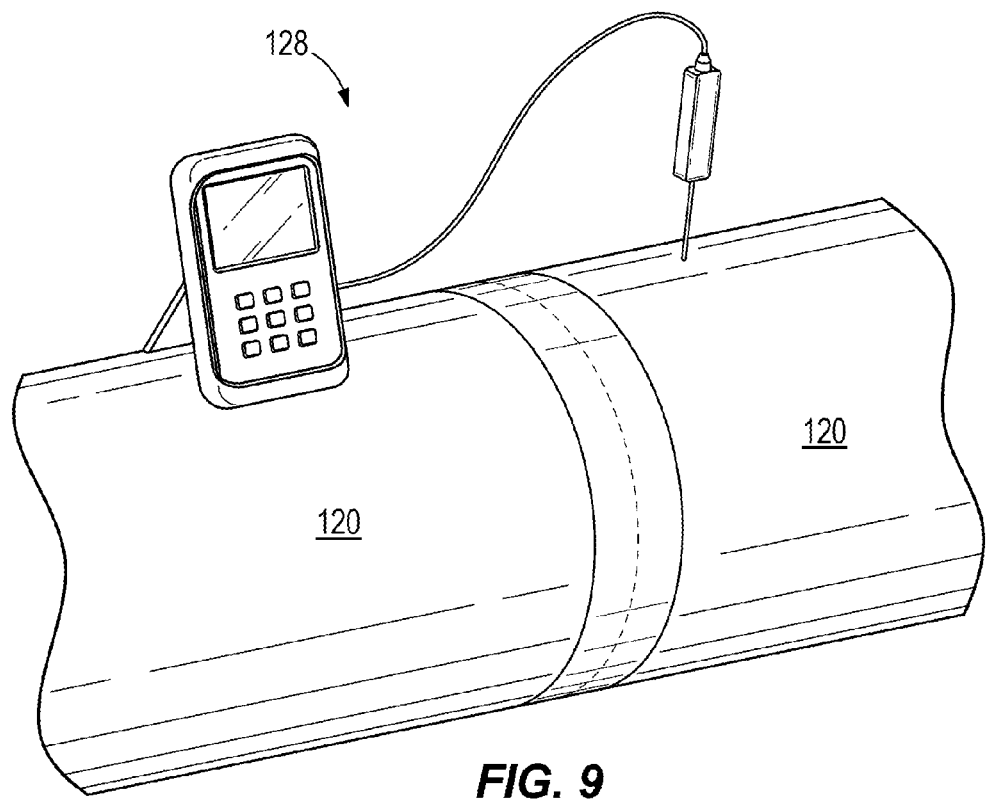
FIG. 9 is a perspective view of a digital thermometer and readout for visually monitoring exterior temperature of the calandria tube.
Figure 10:
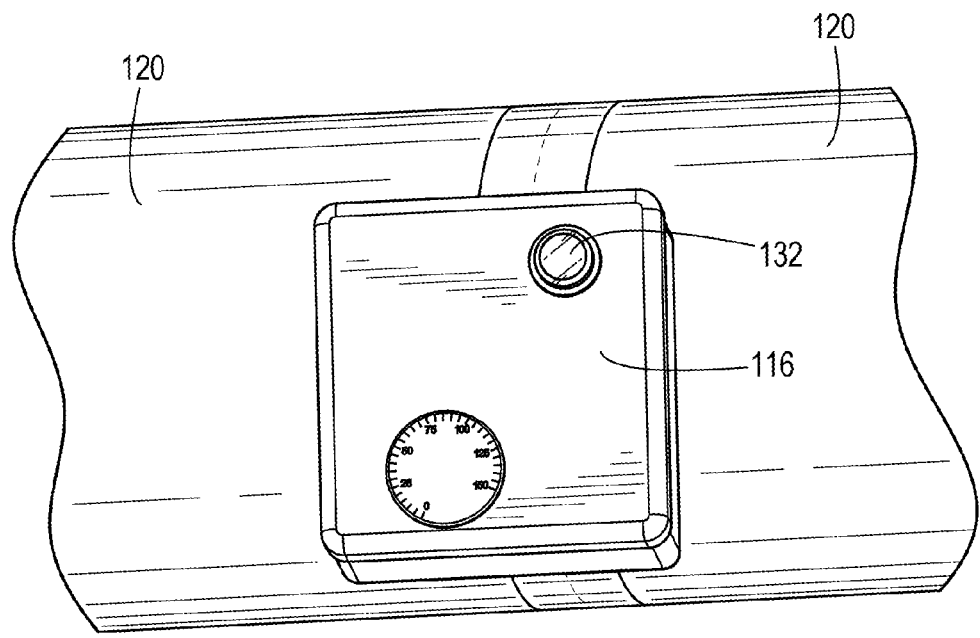
FIG. 10 is a perspective view of an indicator light coupled to the heater control box to indicate when the heater is active.

A thermostat bulb 124 can be installed at a location (e.g., the midpoint along the CT 32) on the exterior surface $32_E$ of the CT 32, through the insulation 120, as shown in FIG. 8. The thermostat bulb 124 can be coupled with the heater control box 116 of FIG. 6 to maintain the exterior surface $32_E$ of the CT 32 at a predetermined set point temperature above ambient. A digital thermometer 128 can also be used to enable an operator to visually monitor the temperature of the exterior surface $32_E$ of the CT 32 as shown in FIG. 9. Regardless of its construction, the thermometer 128 confirms that the exterior surface $32_E$ of the CT 32 is heated to a predetermined temperature above ambient. This may be carried out as an initial step in an annulus spacer locating method in a laboratory setting, and furthermore, can simulate heating of the exterior surface $32_E$ of the CT 32 (e.g., from moderator liquid in a functional reactor). An indicator light 132 can be installed on the heater control box 116 as shown in FIG. 10 to provide a visual indication of when the heater 112 is turned on and off.

Figure 12A:
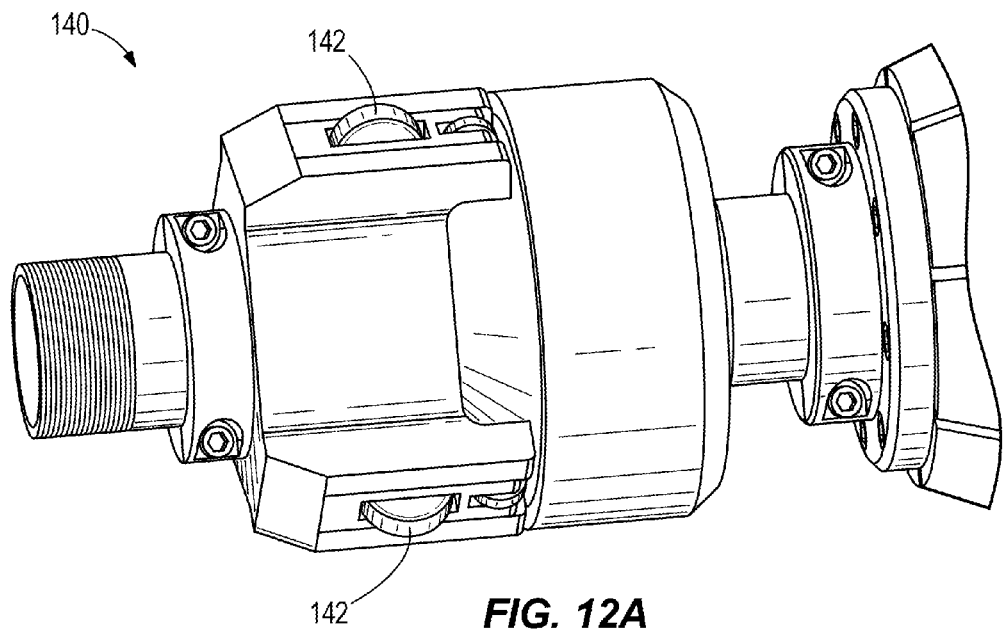
FIGS. 12A and 12B are perspective views of two wheeled centering assemblies at opposed ends of the probe head assembly of FIG. 11.
Figure 12B:
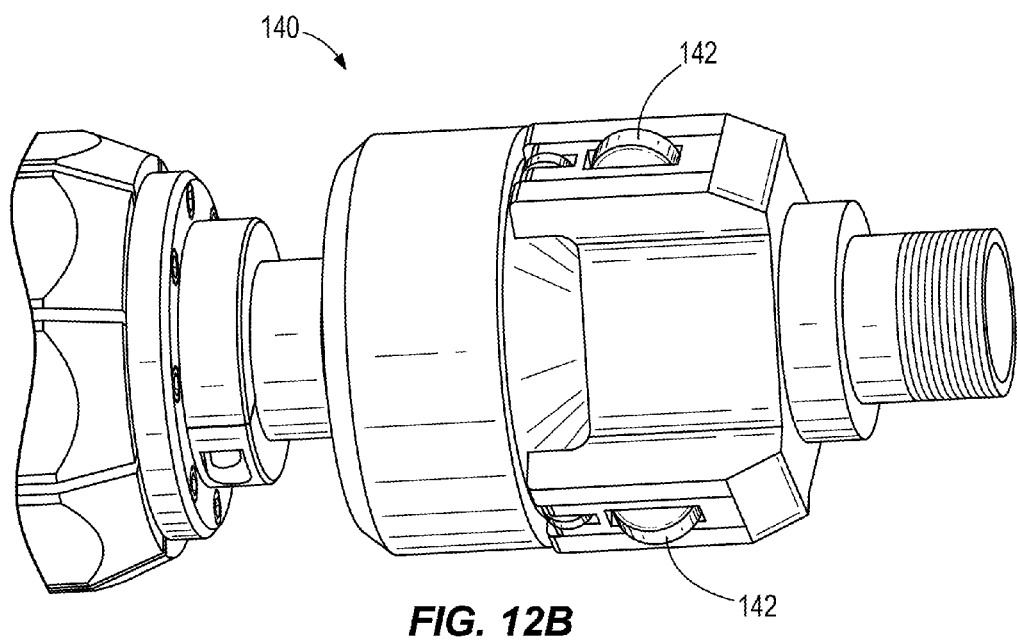

A probe head assembly 136 according to an embodiment of the present invention is illustrated in FIG. 11. As shown in FIGS. 12A and 12B (detail views of FIG. 11), some embodiments of the probe head assembly 136 include inboard and outboard centering assemblies 140, although a single centering assembly can be used in other embodiments.

Any or all of the centering assemblies 140 of the probe head assembly 136 can be provided with one, two, or more wheels 142 that contact and roll along the interior surface $36_I$ of the PT 36 to help in smooth travel and guidance of the probe head assembly 136 as it travels axially within the PT 36. Examples of such wheels 142 are shown in FIGS. 12A and 12B.

Figure 13:
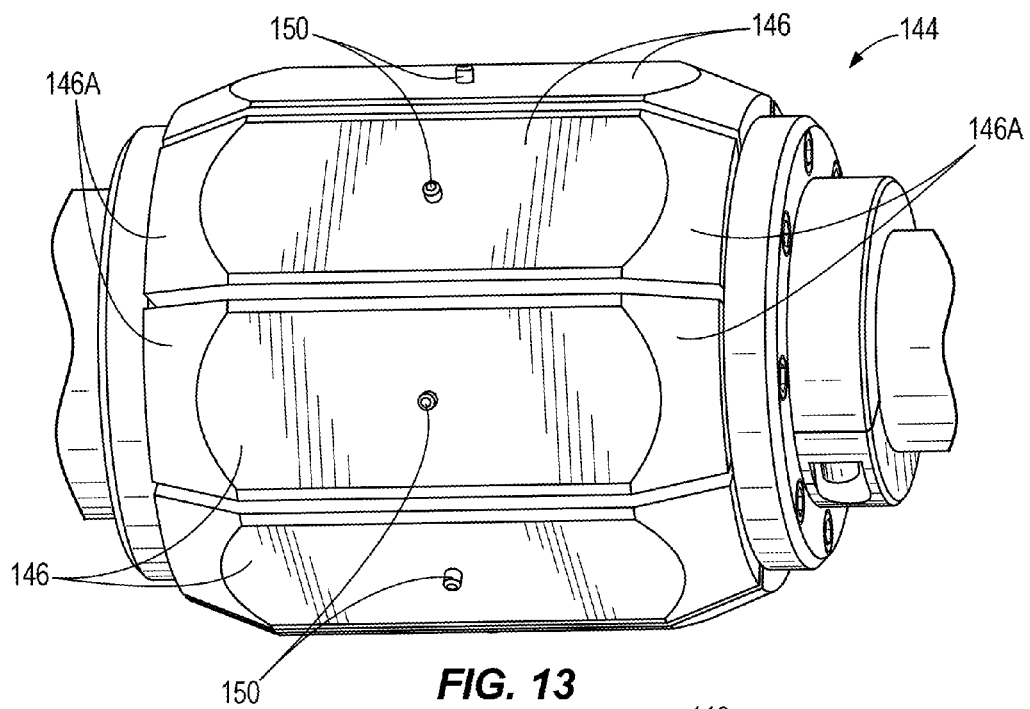
FIG. 13 illustrates a first array of temperature probe blocks of the probe head assembly of FIG. 11, including a radially oriented array of temperature probes.
Figure 14:
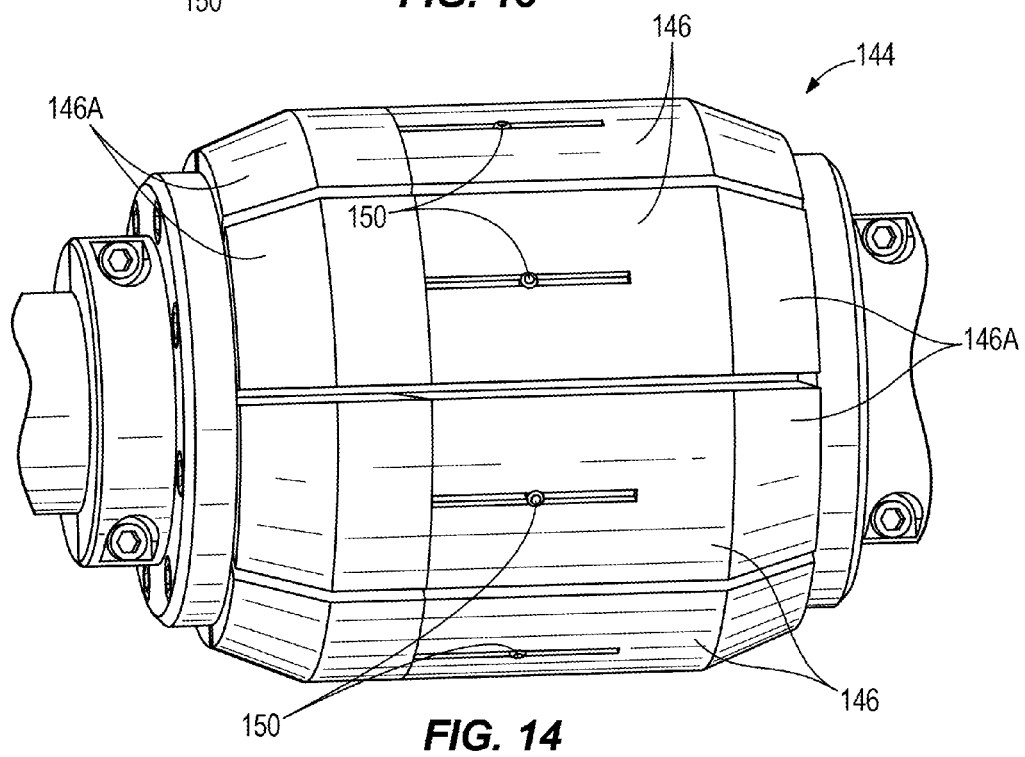
FIG. 14 illustrates a second a first array of temperature probe blocks of the probe head assembly of FIG. 11, includes a radially oriented array of temperature probes.

In one configuration, referred to as the circumferential (absolute) configuration of the probe head assembly 136, at least one radial temperature sensor array 144 is provided. A plurality of spring-loaded (e.g., biased radially outward) guide blocks 146 are provided around the circumference of the probe head assembly 136 at multiple axial positions (e.g., 2 positions in the illustrated construction). Each of the guide blocks 146 can carry one or more temperature probes 150. In the illustrated construction, each of the radial array of guide blocks 146 is provided with a single temperature probe 150 so that, in total, the guide blocks 146 at each axial position provide a radial array of temperature probes 150. The temperature probes 150 may be thermistor or thermocouple probes in any configuration (e.g., thermistor probes on one assembly, thermocouple probes on another, a mix of thermistor and thermocouple probes on either or both assemblies, and the like. In some embodiments by way of example, each temperature probe 150 is set at 0.002 inch past the outer surface of the corresponding guide block 146 to ensure contact of the temperature probe 150 with the interior surface $36_I$ of the PT 36 (see FIGS. 13 and 14). The outer surface of the guide blocks 146 can be generally flat as shown in FIG. 13, or curved about the central axis, as shown in FIG. 14. The guide blocks 146 include tapered outward end surfaces 146A to facilitate easier insertion into to the PT 36.

In the illustrated apparatus, the probe head assembly 136 is provided with first and second pluralities of spring-loaded guide blocks 146 each associated with a centering assembly 140. In this setup, the two sets of guide blocks 146 (and corresponding probes 150) are axially spaced from each other. As indicated above, in other constructions, a single array of temperature probes 150 may be provided in other embodiments of the present invention. As described in further detail below, the radial array(s) of temperature probes 150 in some embodiments may be conveyed or driven axially to additional section(s) of the PT 36 to obtain data on the temperature profile the additional section(s), or the entire interior surface $36_I$, of the PT 36.

Figure 15:
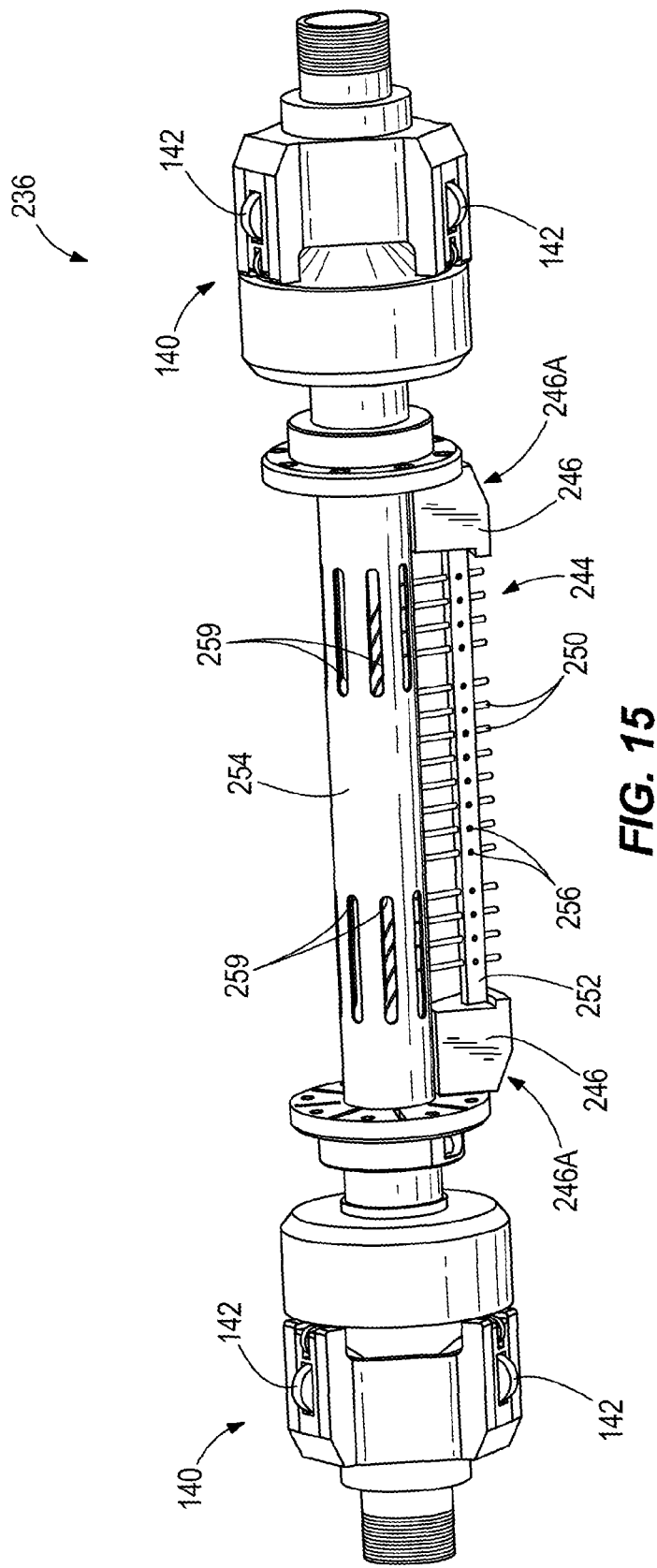
FIGS. 15 and 16 illustrate an alternate temperature probe block for use with the probe head assembly, including an axially extending row of temperature probes at a single radial position of the probe head assembly.
Figure 16:
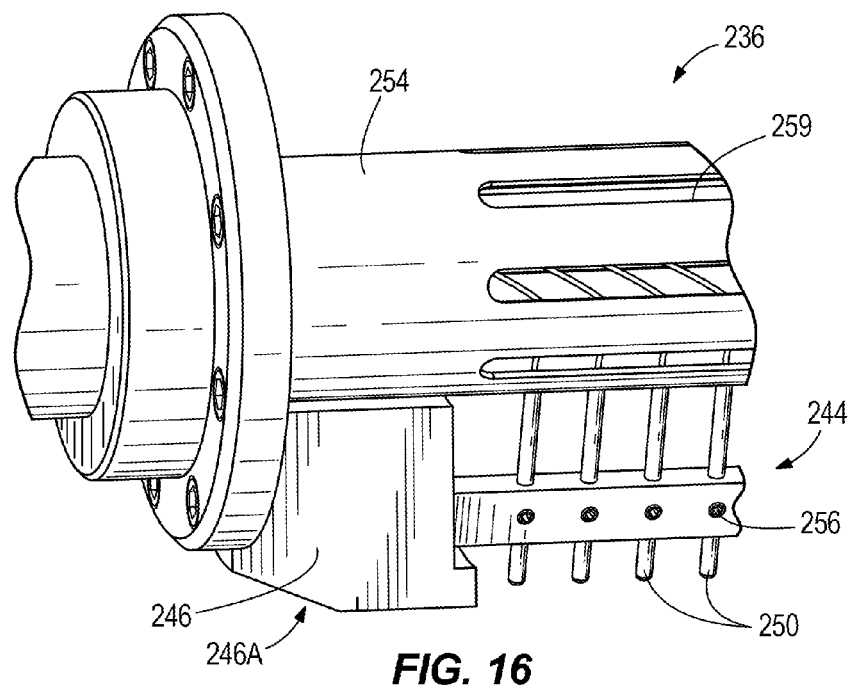

FIGS. 15 and 16 illustrate a probe head assembly 236 of an alternate construction of the present invention, referred to as the axial probe head assembly. In this construction, multiple temperature probes 250 are provided in an axial array, with each temperature probe 250 positioned at a unique axial position. In the illustrated construction, all of the temperature probes 250 are provided in alignment at a common radial position in a row. All of the temperature probes 250 in the illustrated embodiment of FIGS. 15 and 16 are mounted to a carrier bar 252 (e.g., a plexiglass bar), which is coupled in a spring-loaded manner (e.g., biased radially outward) to a perforated tubular body 254 of the probe head assembly 236. In the illustrated construction, the carrier bar 252 is securely coupled between a pair of guide blocks 246, which are spring-biased with respect to the tubular body 254. The guide blocks 246, like the guide blocks 146 of FIGS. 13 and 14, include tapered outward end surfaces 246A. The temperature probes 250 can be secured to the carrier bar 252 individually with corresponding fasteners 256 (e.g., set screws). Each temperature probe 250 can be positioned to make contact with the interior surface $36_I$ of the PT 36 when the probe head assembly 236 is inserted into the PT 36. The row of temperature probes 250 can contain thermocouples, thermistors, or a combination of both in any desired arrangement. As described in further detail below, the row of temperature probes 250 may be rotated about the axis of the PT 36 to obtain data on the temperature profile of the interior surface $36_I$ of the PT 36, or at least a lengthwise section thereof. The probe head assembly 250 can then be conveyed or driven to additional section (s) of the PT 36 to obtain data on the temperature profile of the additional section(s), or the entire interior surface $36_I$, of the PT 36.

Alternatively or in addition, the system and method may utilize one or more non-contact temperature sensors 800 or "thermal imaging devices" to collect data representative of the temperature of various locations on the interior surface $36_I$ of the PT 36. For example, one or more infrared cameras 800 may be provided on the probe head assembly 136, 236 and inserted into the PT 36 and operated to detect the temperature profile thereof, and to output a corresponding electrical signal representative thereof. The probe head assembly 236 of FIG. 19 is illustrated with one non-contact temperature sensor 800 for illustrative purposes.

Figure 17:
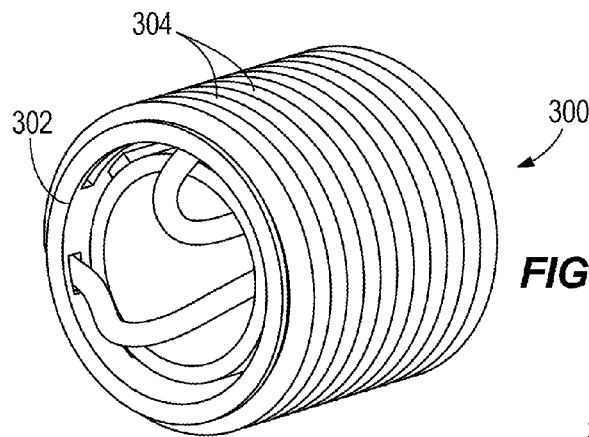
FIGS. 17 and 18 illustrate a water jacket for providing localized cooling to the inside of the pressure tube.
Figure 18:
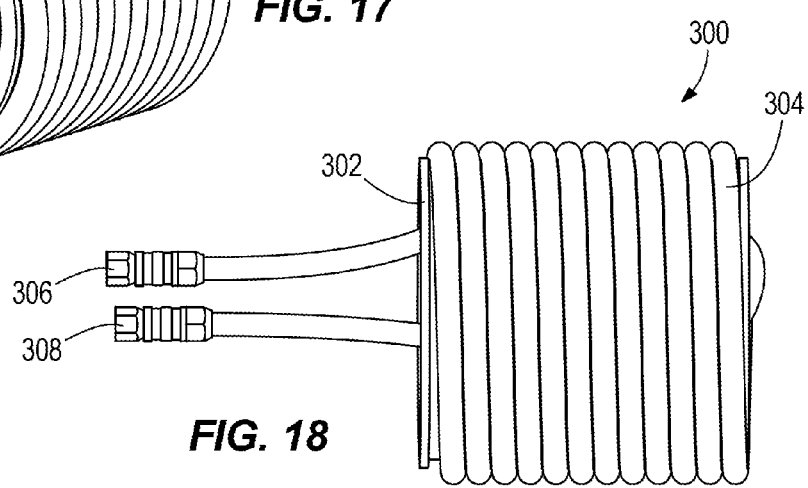

FIGS. 17 and 18 illustrate a water jacket 300 for use with either of the probe head assemblies of FIGS. 11-16. The illustrated water jacket 300 includes a central support spool 302 and a coil 304 of water tubing for conveying cooling water between an inlet 306 and an outlet 308 of the water jacket 300. The water jacket 300 can have an outer diameter about the same size as, or slightly larger than, the interior diameter of the PT 36 so that the coil 304 of water tubing is pressed upon the interior surface $36_I$ of the PT 36. The water jacket 300 can be supplied with chilled water (e.g., supplied axially down the center of the pressure tube) to produce a localized cooling effect at or adjacent the probe head assembly 136, 236. Thus, the water jacket 300 can act as an active heat sink to increase the temperature gradient between the interior surface $36_I$ of the PT 36 and the exterior surface $32_E$ of the CT 32 (which may be heated) as described above immediately prior to or during the temperature detection of the PT 36. For example, if the water jacket 300 is attached to a distal end of the probe head assembly 136, chilled water running through the coil 304 of water tubing can cool the interior surface $36_I$ of the PT 36 at the location of the water jacket 300, after which time the probe head assembly 136 can be axially moved along the PT 36 to bring the temperature probes 150 of one of the arrays into an axial position adjacent the cooled section of the PT 36 in order to perform the temperature measurements of the interior surface $36_I$ of the PT 36 in the cooled section. Alternatively, the water jacket 300 can be located sufficiently close to (e.g., immediately adjacent one or more temperature probes 150) to generate a similar cooling effect of the PT 36 without subsequent movement of the probe head assembly 136 to take the above-described temperature measurements. Of course, the water jacket 300 can be used with similar effect with the probe head assembly 236 of FIGS. 15 and 16. It should be understood that the water jacket 300 may convey water or any other suitable heat exchange fluid.

Figure 19:
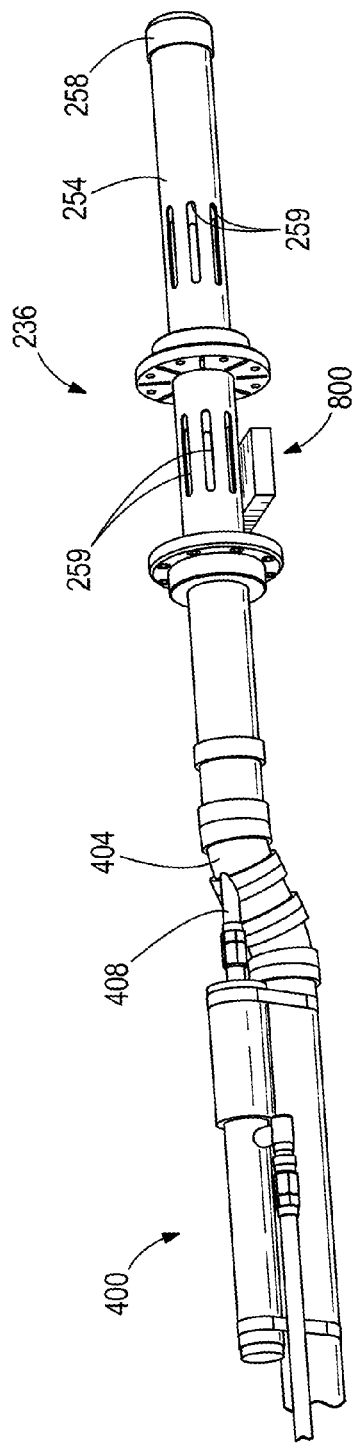
FIG. 19 is a perspective view of a cold air generator coupled to the probe head assembly to provide a supply of air chilled to a predetermined temperature below ambient.
Figure 20:
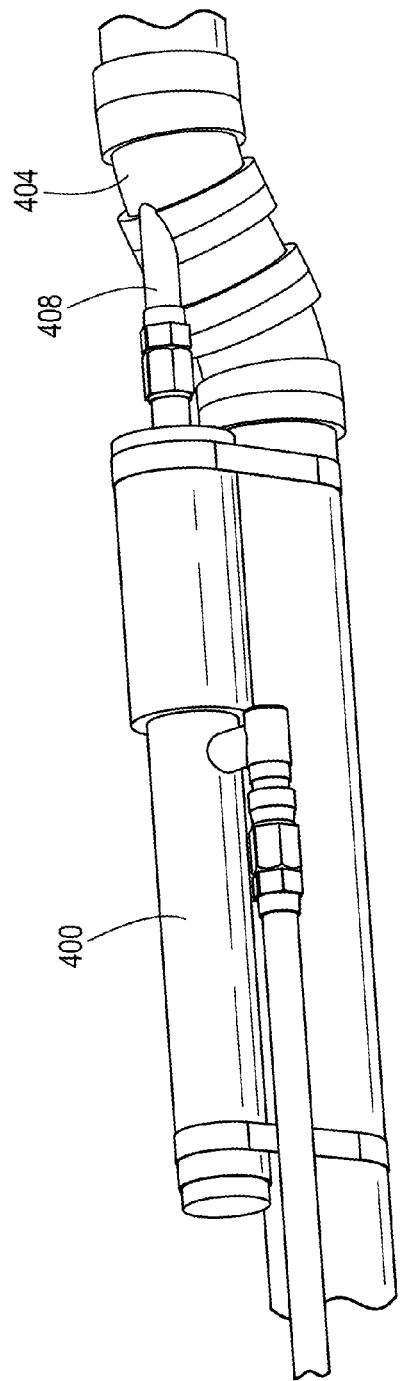
FIG. 20 is a perspective view illustrating a fitting for inserting the outlet tube of the cold air generator into the interior of the probe head assembly.

FIG. 19 illustrates an alternate apparatus to actively cool the interior surface $36_I$ of the PT 36. A cold air generator 400 (e.g., a "ColdGun", available from EXAIR Corporation) may be used to provide a supply of air chilled to a predetermined temperature below ambient. The chilled air can be blown into the inside of the PT 36 around and/or through the probe head assembly 136, 236. For example, FIG. 20 illustrates a fitting 404 for inserting an outlet tube 408 of the cold air generator 400 into the interior of the probe head assembly 236 of FIGS. 15 and 16. The tubular body 254 of the probe head assembly 236 is perforated through the sides, via apertures 259, and includes an open distal end 254A to allow passage of the chilled air into contact with the interior surface $36_I$ of the PT 36.

Figure 21:
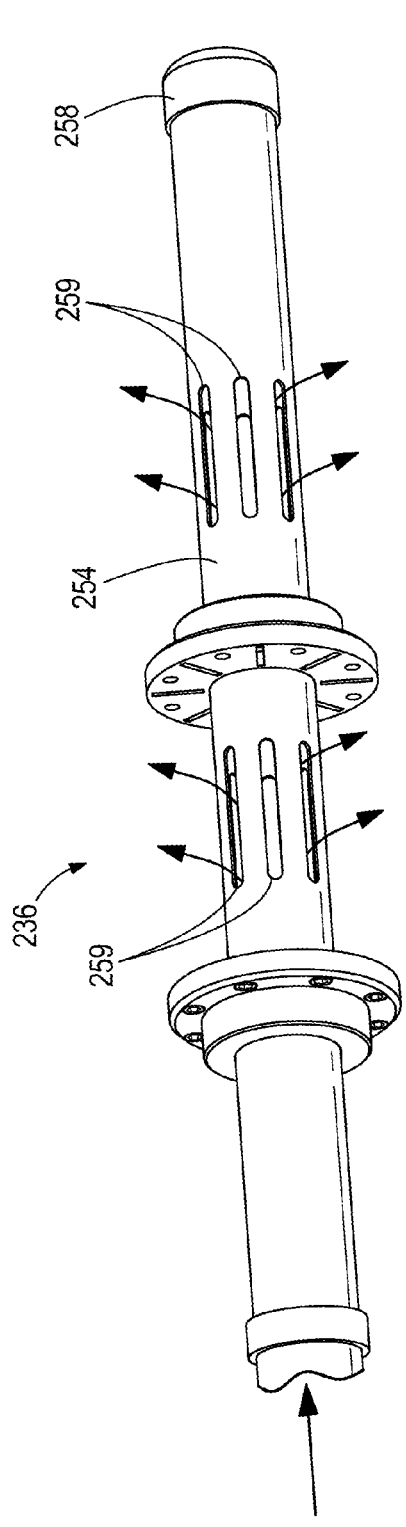
FIG. 21 is a perspective view of a tubular body of the probe head assembly in a short-length configuration in which a distal end of the tubular body is closed.
Figure 22:
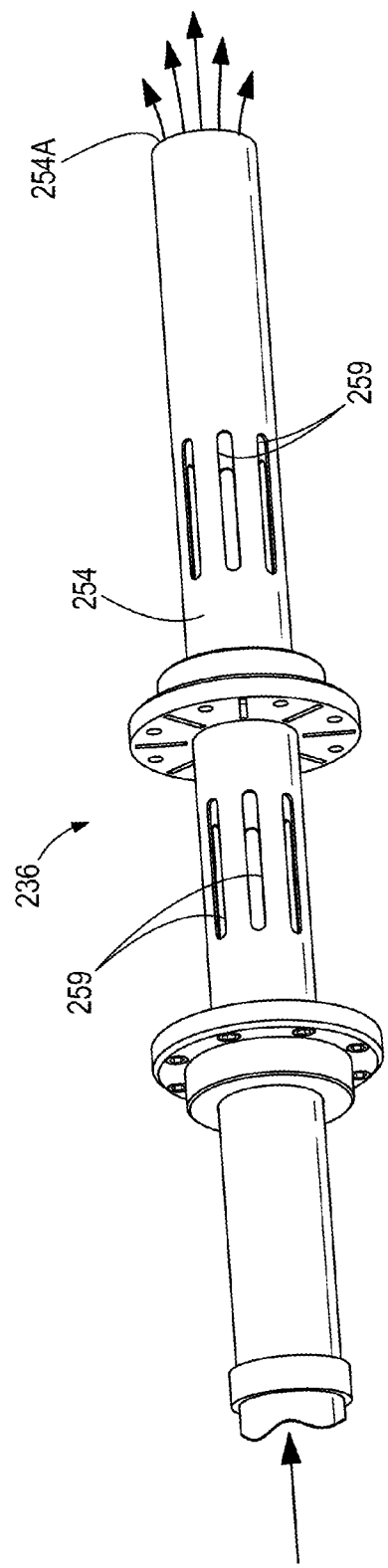
FIG. 22 is a perspective view of a tubular body of the probe head assembly in a long-length configuration in which a distal end of the tubular body is open.

As shown in FIGS. 21 and 22, the tubular body 254 of the probe head assembly 236 can be configured for different axial lengths corresponding to different axial-length temperature probe constructions. The temperature probes 250 or non-contact temperature sensor(s) 800 are not shown here for simplicity. When provided in a short-length configuration, the end of the tubular body 254 can be closed (e.g., an end cap 258 is provided over the distal end 254A) so that localized cooling is provided via the apertures 259. When provided in a long-length configuration, the distal end 254A of the tubular body 254 can be open (e.g., the end cap 258 is removed) for large area pressure tube cooling. The chilled air can be provided through the distal end 254A instead of or in addition to the apertures 259.

Figure 23:
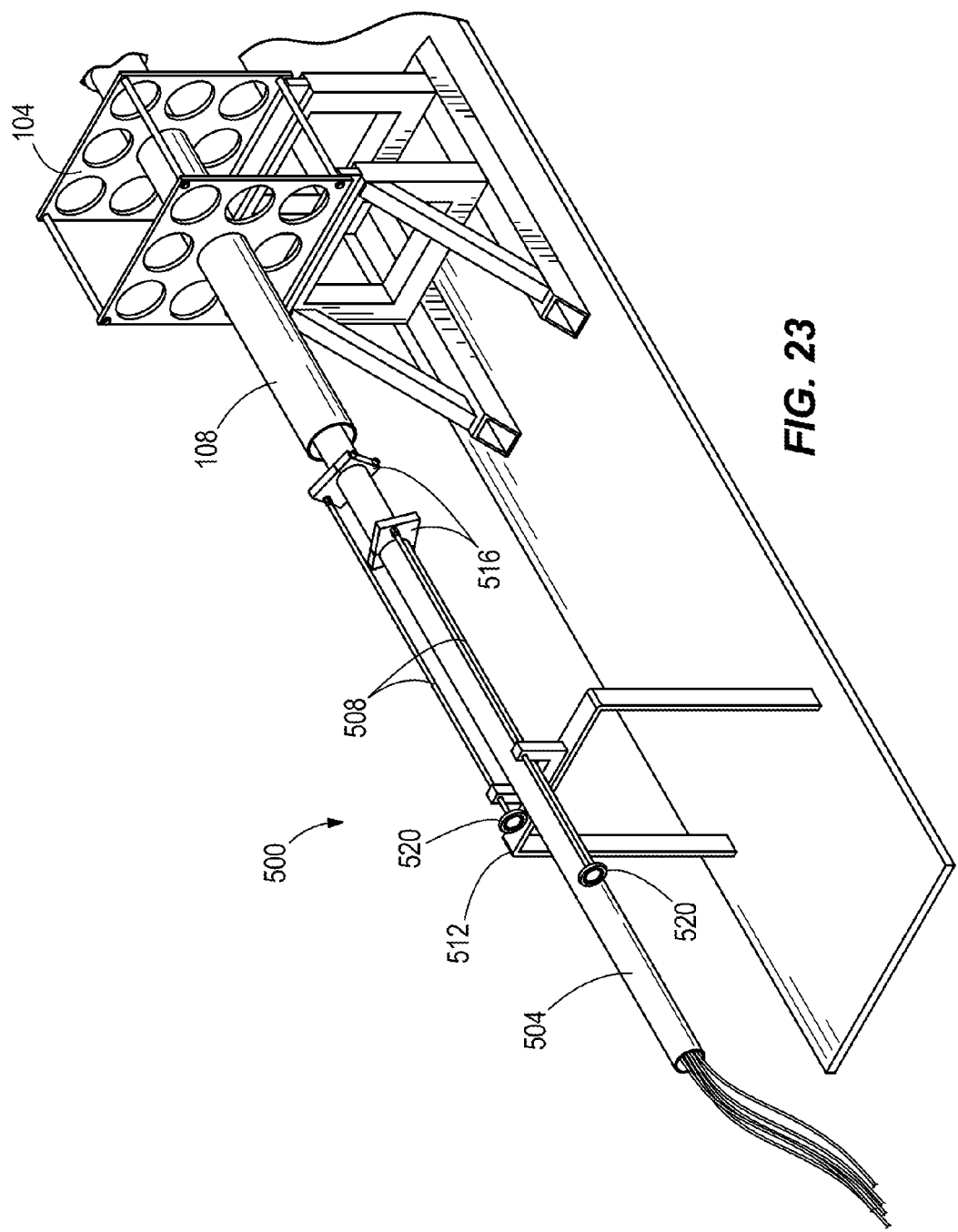
FIG. 23 is a perspective view of a drive system for guiding the probe head assembly through the pressure tube.
Figure 24:
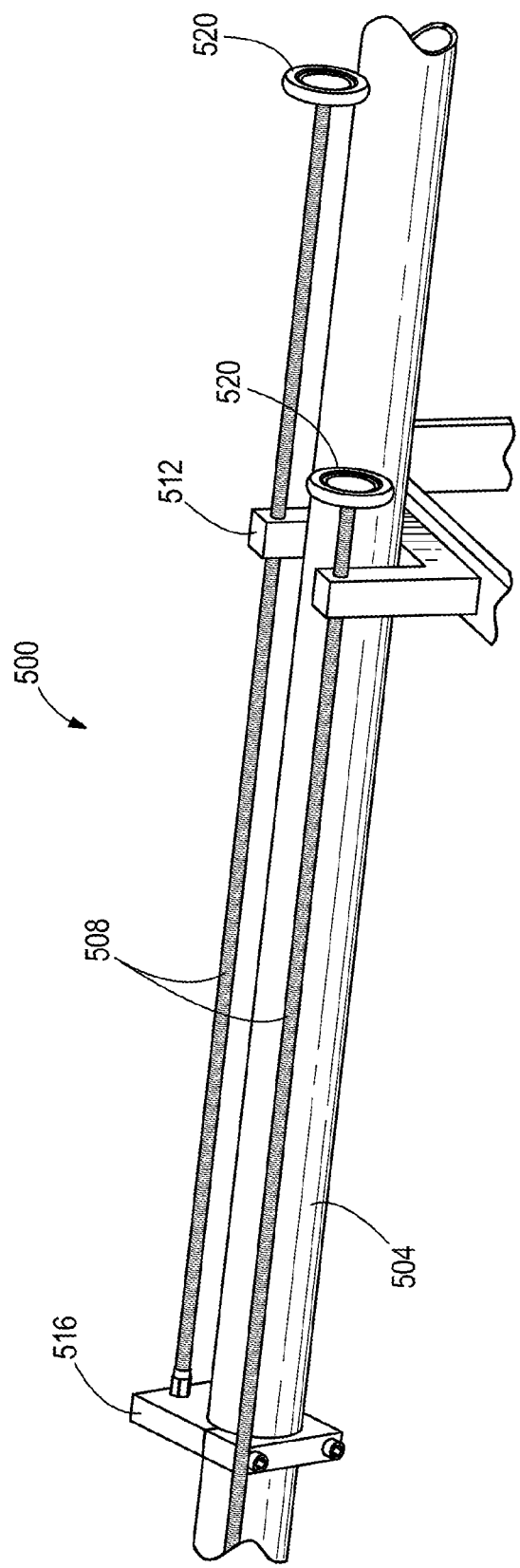
FIG. 24 is a detail view of the drive system of FIG. 23.
Figure 25:
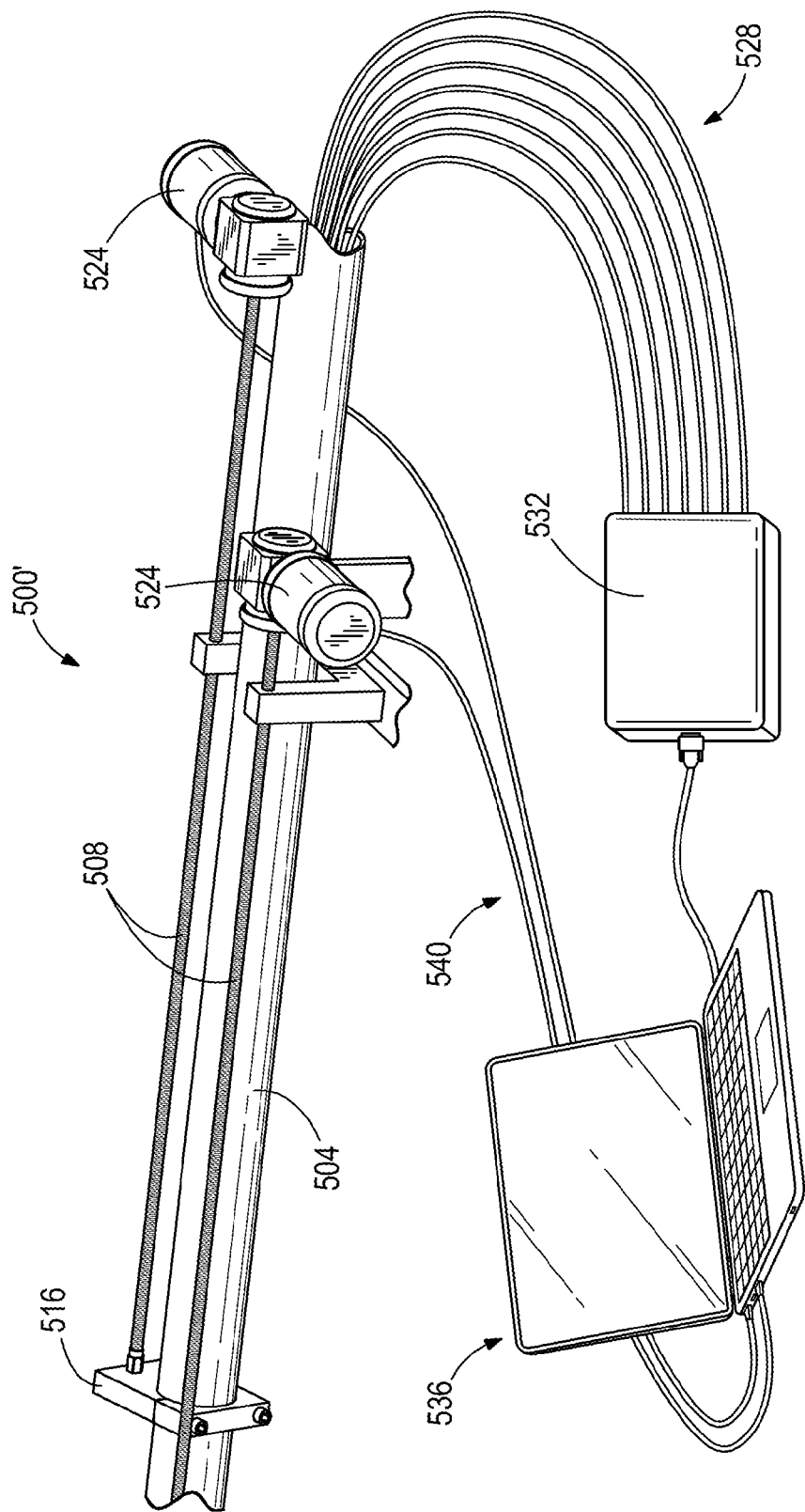
FIG. 25 is a perspective view of a computer-controlled drive system for guiding the probe head assembly through the pressure tube, and data acquisition system.

As shown in FIG. 23, a push rod 504 for guiding the probe head assembly 136, 236 through the PT 36 can include sections of tubing (e.g., four 7-foot lengths of ABS tubing, for example). A drive system 500 can also be provided to drive the probe head assembly 136, 236 through the PT 36 (via the push rod 504). In one construction, the drive system 500 can include two threaded (e.g., ⅜-16) driving rods 508 together with an associated frame 512 and clamps 516 (FIG. 24). In a basic configuration, the probe head assembly 136, 236 can be driven manually (by hand via cranks 520 coupled to the driving rods 508) or by a hand held tool such as a cordless drill, and the probe head assembly 136, 236 can be driven a relatively steady speed through the PT 36 between temperature measurements or as the temperature probes 150, 250 are measuring the temperature of the interior surface $36_I$ of the PT 36. However, in other embodiments, the probe head assembly 136, 236 can be driven with a computer-controlled drive system 500' (including one or more electric motors 524) to provide predictable, programmable drive speed. In this way, position data can be provided to a data acquisition system (DAS) along with temperature data from the temperature probes 150, 250 to generate a coordinated output representing the temperature profile of the interior surface $36_I$ of the PT 36. As shown in FIG. 25, signals representative of measured temperatures can be routed via temperature probe leads 528 through a GEC junction box 532 to a computer (e.g., a laptop computer 536), used to capture, store, process and display the acquired data. Signals representative of position data (e.g., from a motor encoder) can be routed back to the computer 536 directly or indirectly via motor leads 540. The temperature and/or position data may be displayed in real time in some configurations.

By creating a temperature gradient between the exterior surface $32_E$ of the CT and the interior surface $36_I$ of the PT 36 and obtaining a temperature profile of the interior surface $36_I$ of the PT 36, the position of each annulus spacer 48 can be detected. This can be accomplished in the above-described embodiments of the present invention by observing localized temperature variations in the area of each annulus spacer 48. The above-described test setup sets forth several specific structures and methods for determining the positions of annulus spacers 48 in a particular laboratory setting, but the invention is not limited to such constructions, and the invention may be carried out in a variety of ways with a variety of equipment. Temperature profiling can be used to detect the position of an annulus spacer 48 in a fuel channel assembly, which may be adapted to other specific tooling assemblies, test setups, and/or processes for either a laboratory setting (e.g., prior to assembly of a fuel channel assembly into a reactor) a functional reactor, a shut down reactor or a laid up reactor. In working on a functional reactor or shutdown reactor, the temperature gradient between the exterior surface $32_E$ of the CT 32 and the interior surface $36_I$ of the PT 36 can be generated by heated moderator liquid outside the CT 32, and/or by optionally cooling the interior surface $36_I$ of the PT 36 (e.g., in any of the above-described manner, or in another manner) when fuel 40 has been removed from the PT 36.

In some embodiments, the thermal gradient detected by the apparatus and methods described and illustrated herein can be generated by moderator liquid that is colder than the interior surface $36_I$ of the PT 36—a state that can be accomplished by permitting the moderator to cool sufficiently (or even actively cooling the moderator liquid) and/or by heating the interior surface $36_I$ of the PT 36 in a similar manner as described above in connection with cooling devices.

It should be clear that the present invention contemplates both a "passive" location method, which does not require the implementation of an artificial heat source or heat sink to enhance the thermal gradient between the PT 36 and the CT 32, and an "active" location method, which takes advantage of a separate heat source and/or a heat sink to generate or enhance a temperature gradient and therefore to enhance the ability to detect the locations of the annulus spacers 48 (i.e., solely for the purpose of locating the annulus spacers 48). In the passive method, the temperature reading (recording)/mapping instruments map the temperature variation (changes) on the interior surface $36_I$ of the PT 36 to identify, through the localized temperature anomaly or abnormality (where the temperature of the interior surface $36_I$ of the PT 36 is closest to the temperature of the exterior surface $32_E$ of the CT 32, in other words, a reduced temperature gradient), the effect of the "heat leak" between various parts of the fuel channel assembly. Active methods may include the implementation of the continuous or specifically pulsed "heat source" or continuous or specifically pulsed "heat sink" inside the PT 36, before performing the temperature recoding/mapping. As in the passive method, the temperature reading (recording)/mapping instruments map the temperature variation (changes) on the interior surface $36_I$ of the PT 36 to identify, through the localized temperature, the effect of the "heat leak" between various parts of the fuel channel assembly. However, in an active method, the "heat leak" is enhanced by localized pre-heating or pre-cooling of the interior surface $36_I$ of the PT 36. A location of contact or near-contact between the PT 36 and the CT 32 through an annulus spacer 48 will be presented as the localized temperature gradient detected by one or more of the temperature probes 150, 250 (or non-contact temperature sensors) described above, such as at different circumferential positions (e.g., at the 6 o'clock or nearby position), or continuously around the circumference of the PT 36.

It should also be understood that the concept of thermal mapping to locate annulus spacers 48 can be effective regardless of which one of the inside and the outside is the "hot" side. In other words, it is possible to obtain good results by heating the interior surface $36_I$ of the PT 36 to a temperature in excess of the temperature of the exterior surface $32_E$ of the CT 32.

Furthermore, any method of thermal mapping disclosed herein can be supplemented by monitoring of the ultrasonic test (UT) (shear and/or longitudinal) velocity change in the "heat leak" area, which (ultrasonic velocity change) will be an effect of the localized temperature difference corresponding to the location of contact between the annulus spacer 48 and the PT 36

Although the description above is in connection with the detection of annulus spacers between concentric tubes of a fuel channel assembly in a nuclear reactor, it will be appreciated that the present invention can be used in other applications to detect the location of an object outside of a tube (and capable of thermal detection by a thermal gradient relative to the tube). Such objects need not necessarily encircle the tube or otherwise be annular in shape, and need not necessarily be located in a space between concentric tubes. Accordingly, aspects of the present invention find application in pipeline repair and maintenance, drilling systems, and the like.

What is claimed is:

1. An apparatus for detecting the location of an annulus spacer between concentric interior and exterior tubes when a temperature gradient is present between an interior surface of the interior tube and an exterior surface of the exterior tube, the apparatus comprising:
a probe head assembly movable within the interior tube;
at least one temperature sensor coupled to the probe head assembly and configured to detect a temperature of the interior surface of the interior tube;
a drive assembly operable to move the probe head assembly relative to the interior tube; and
a data acquisition system coupled to the at least one temperature sensor and configured to receive a plurality of temperature measurements in order to identify at least one position along the interior surface of the interior tube having a temperature abnormality in which the temperature of the interior surface of the interior tube is closer to a temperature of the exterior surface of the exterior tube with respect to other positions along the interior surface of the interior tube.

2. The apparatus of claim 1, wherein the probe head assembly includes a wheeled centering assembly.

3. The apparatus of claim 1, wherein the drive assembly includes at least one threaded rod configured to axially slide the probe head assembly through the interior tube when rotated.

4. The apparatus of claim 1, wherein the at least one temperature sensor includes a non-contact thermal imaging device.

5. The apparatus of claim 1, wherein the drive assembly includes a computer-controlled drive.

6. The apparatus of claim 5, wherein the drive assembly is configured to provide position data to the data acquisition system to be correlated with the temperature measurements to develop a temperature map of the interior surface of the interior tube.

7. The apparatus of claim 6, further comprising a display device configured to display the temperature map in real time.

8. The apparatus of claim 1, further comprising one of an active heating apparatus and an active cooling apparatus configured to establish or enhance a thermal gradient between the interior surface of the interior tube and the exterior surface of the exterior tube.

9. The apparatus of claim 8, wherein the active cooling device is coupled to the probe head assembly and configured to chill the interior surface of the interior tube.

10. The apparatus of claim 9, wherein the active cooling device is a liquid cooling jacket including a central support spool and a coil of tubing for conveying a chilled heat exchange fluid.

11. The apparatus of claim 9, wherein the active cooling device is a cold air generator.

12. The apparatus of claim 1, wherein the at least one temperature sensor includes a plurality of temperature probes positionable in contact with the interior surface of the interior tube when the probe head assembly is positioned inside the interior tube.

13. The apparatus of claim 12, wherein the plurality of temperature probes are arranged in an axial row.

14. The apparatus of claim 12, wherein the plurality of temperature probes are coupled to the probe head assembly to be biased in a radially outward direction.

15. The apparatus of claim 12, wherein the plurality of temperature probes are arranged in a circular array at a first axial location.

16. The apparatus of claim 15, further comprising a second plurality of temperature probes arranged in a circular array at a second axial location.

17. A method for detecting the location of at least one annulus spacer between concentric interior and exterior tubes having a temperature gradient therebetween between an interior surface of the interior tube and an exterior surface of the exterior tube, the method comprising:
   inserting a probe head assembly including at least one temperature sensor into the interior tube;
   detecting the temperature of an interior surface of the interior tube at a plurality of locations along the interior surface; and
   identifying at least one position along the interior surface of the interior tube having a temperature abnormality corresponding to a reduced temperature gradient.

18. The method of claim 17, wherein detecting the temperature of an interior surface of the interior tube at a plurality of locations along the interior surface includes detecting the temperature with a non-contact thermal imaging device.

19. The method of claim 17, wherein a plurality of annulus spacers between the interior and exterior tubes are detected by identifying a plurality of positions along the interior surface of the interior tube, each having a temperature abnormality corresponding to a reduced temperature gradient.

20. The method of claim 17, further comprising
   driving the probe head assembly to a plurality of locations within the interior tube;
   collecting position data corresponding to the position of the at least one temperature sensor; and
   correlating temperature data and position data to develop a temperature map of the interior surface.

21. The method of claim 20, further comprising displaying the temperature map in real time.

22. The method of claim 17, further comprising establishing one of the interior and exterior tubes as a hot side and the other of the interior and exterior tubes as a cold side, and at least one of actively heating the hot side and active cooling the cold side to establish or enhance a thermal gradient between the interior and exterior tubes.

23. The method of claim 22, wherein the interior surface of the interior tube is actively cooled by blowing chilled air from a cold air generator on the interior surface.

24. The method of claim 22, wherein the interior surface of the interior tube is actively cooled by providing a liquid cooling jacket on the probe head assembly and flowing a chilled heat exchange fluid through the liquid cooling jacket.

25. The method of claim 17, wherein detecting the temperature of an interior surface of the interior tube at a plurality of locations along the interior surface includes providing a plurality of probes in contact with the interior surface.

26. The method of claim 25, wherein detecting the temperature of an interior surface of the interior tube at a plurality of locations along the interior surface includes detecting a plurality of temperatures at a first axial location along the interior surface with the plurality of probes, moving the plurality of probes to a second axial location along the interior surface with a drive assembly coupled to the probe head assembly, and detecting a plurality of temperatures at the second axial location.

27. The method of claim 25, wherein detecting the temperature of an interior surface of the interior tube at a plurality of locations along the interior surface includes detecting the temperature of the interior surface at a plurality of axially spaced positions with the probe head assembly at a first position.

28. The method of claim 27, further comprising moving the probe head assembly to a second position and detecting the temperature of the interior surface of the interior tube at a plurality of additional axially spaced positions.

* * * * *